US009378287B2

(12) United States Patent
Frey

(10) Patent No.: US 9,378,287 B2
(45) Date of Patent: Jun. 28, 2016

(54) ENHANCED SEARCH SYSTEM AND METHOD BASED ON ENTITY RANKING

(76) Inventor: Patrick Frey, Muenster (DE)

( * ) Notice: Subject to any disclaimer, the term of this patent is extended or adjusted under 35 U.S.C. 154(b) by 165 days.

(21) Appl. No.: 13/326,141

(22) Filed: Dec. 14, 2011

(65) Prior Publication Data

US 2012/0089617 A1 Apr. 12, 2012

(51) Int. Cl.
*G06F 7/02* (2006.01)
*G06F 17/30* (2006.01)
(52) U.S. Cl.
CPC .... *G06F 17/30867* (2013.01); *G06F 17/30861* (2013.01); *G06F 17/30864* (2013.01)
(58) Field of Classification Search
CPC .............. G06F 17/30867; G06F 17/30864; G06F 17/30861; G06F 17/30
See application file for complete search history.

(56) References Cited

U.S. PATENT DOCUMENTS

| 6,892,179 | B1 | 5/2005 | Zacharia |
| 6,895,385 | B1 | 5/2005 | Zacharia |
| 7,734,609 | B2 | 6/2010 | Manfredi et al. |
| 8,010,459 | B2 * | 8/2011 | Buyukkokten et al. ....... 705/319 |
| 8,244,721 | B2 * | 8/2012 | Morris et al. ................. 707/723 |
| 8,290,809 | B1 * | 10/2012 | Ratterman et al. ........... 705/7.29 |
| 8,380,709 | B1 * | 2/2013 | Diller et al. .................... 707/723 |
| 2005/0149383 | A1 | 7/2005 | Zacharia |
| 2005/0256866 | A1 * | 11/2005 | Lu et al. ........................... 707/5 |
| 2006/0042483 | A1 * | 3/2006 | Work et al. ...................... 101/91 |
| 2008/0015925 | A1 | 1/2008 | Sundaresan et al. |
| 2009/0049041 | A1 | 2/2009 | Tareen et al. |
| 2009/0327054 | A1 | 12/2009 | Yao et al. |
| 2010/0153215 | A1 * | 6/2010 | Abraham .......... G06F 17/30867 705/14.55 |
| 2012/0209832 | A1 * | 8/2012 | Neystadt et al. .............. 707/723 |
| 2013/0018862 | A1 * | 1/2013 | Munemann .................... 707/706 |

OTHER PUBLICATIONS

Cho, Jin Hyung, and Hwan Soo Kang. "Implicit Extraction of User Credibility for Reputation Systems in E-Commerce." Source (2006) : 183-190.
Cho, J, K Kwon, and Y Park. "Q-rater: A collaborative reputation system based on source credibility theory." Expert Systems with Applications 36.2 (2009) : 3751-3760.
Gutowska, Anna, Andrew Sloane, and K A Buckley. "On desideratum for B2C E-commerce reputation systems." Journal of Computer Science and Technology 24.5 (2009) : 820-832.
Zacharia G. "Collaborative Reputation Mechanisms for Online Communities". MIT Program of Media Arts and Sciences, School of Architecture and Planning, Aug. 6, 1999.
Zacharia G. et al. "Collaborative reputation mechanisms in electronic marketplaces." Decision Support Systems 29.4 (1999) : 7.
Zacharia G. and P. Maes 2000. Trust management through reputation mechanisms. Applied Artificial Intelligence, 14: 881-907.
Widjojo et al. "User Performance Rating System", U.S. Appl. No. 12/854,148, filed Aug. 10, 2010, 46 pages.

* cited by examiner

*Primary Examiner* — Bruce Moser

(57) ABSTRACT

Enhanced search system and method based on entity ranking that accepts votes for online and offline users and calculates rankings for user attributes that are used to provide highly valued search results. An input is received from a user indicating an opinion of another user or plurality of other users. In one embodiment, reputation scores are weighted by the reputation scores of voters. In another embodiment, weights are derived from voter reputation scores in the domain in which the voting took place. In another embodiment, reputation scores are adjusted according to a plurality of factors, including, but not limited to, user demographics or user behavior.

12 Claims, 12 Drawing Sheets

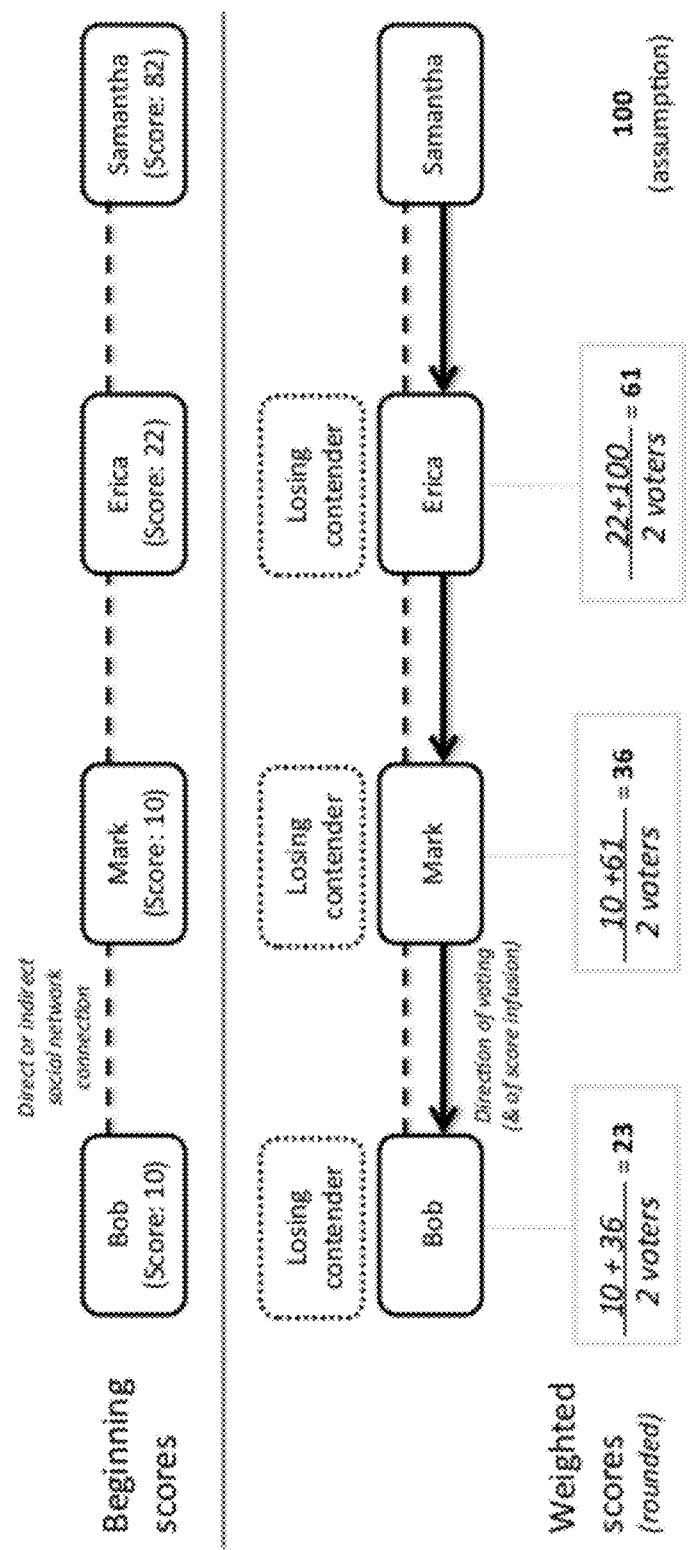

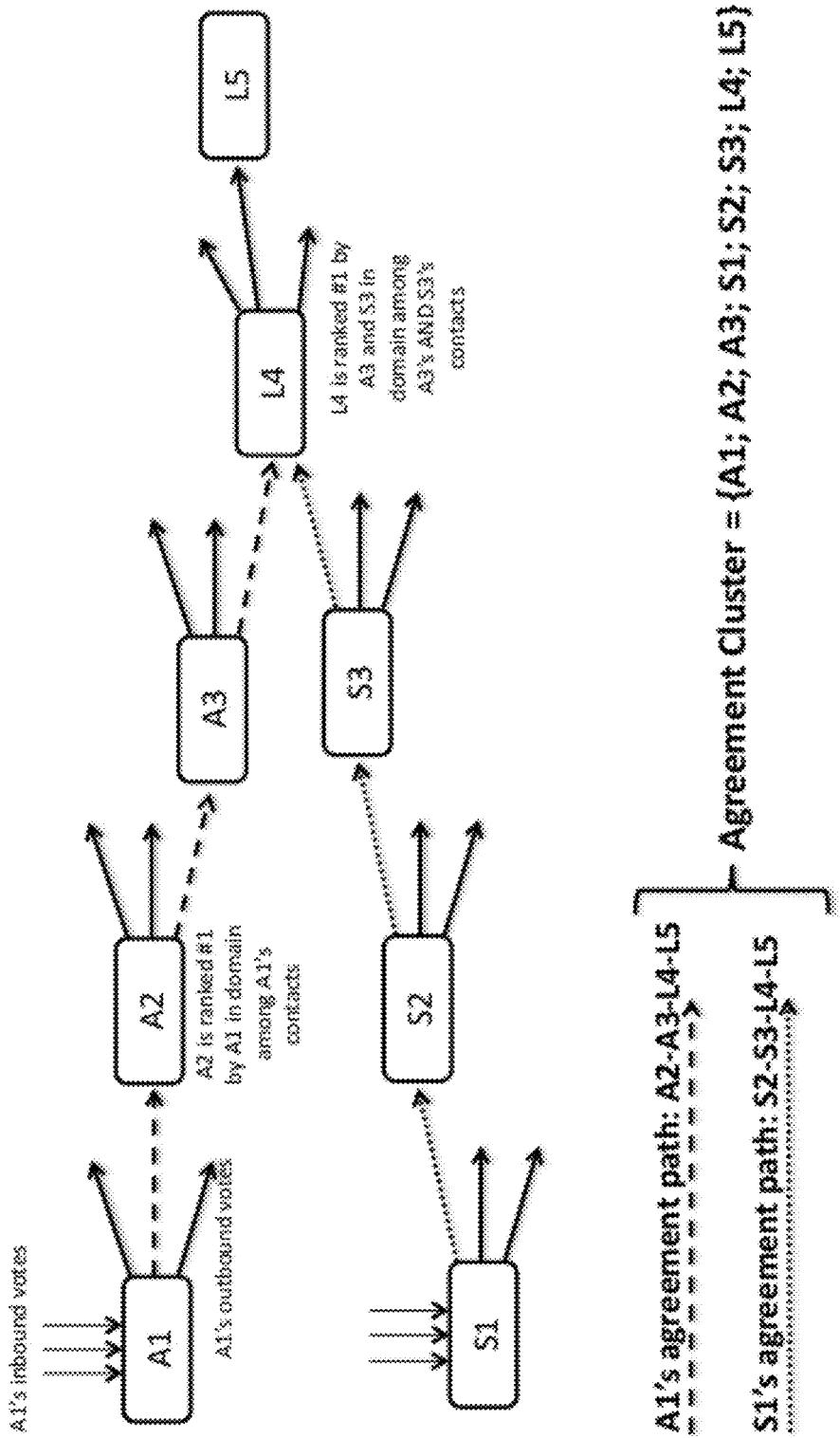

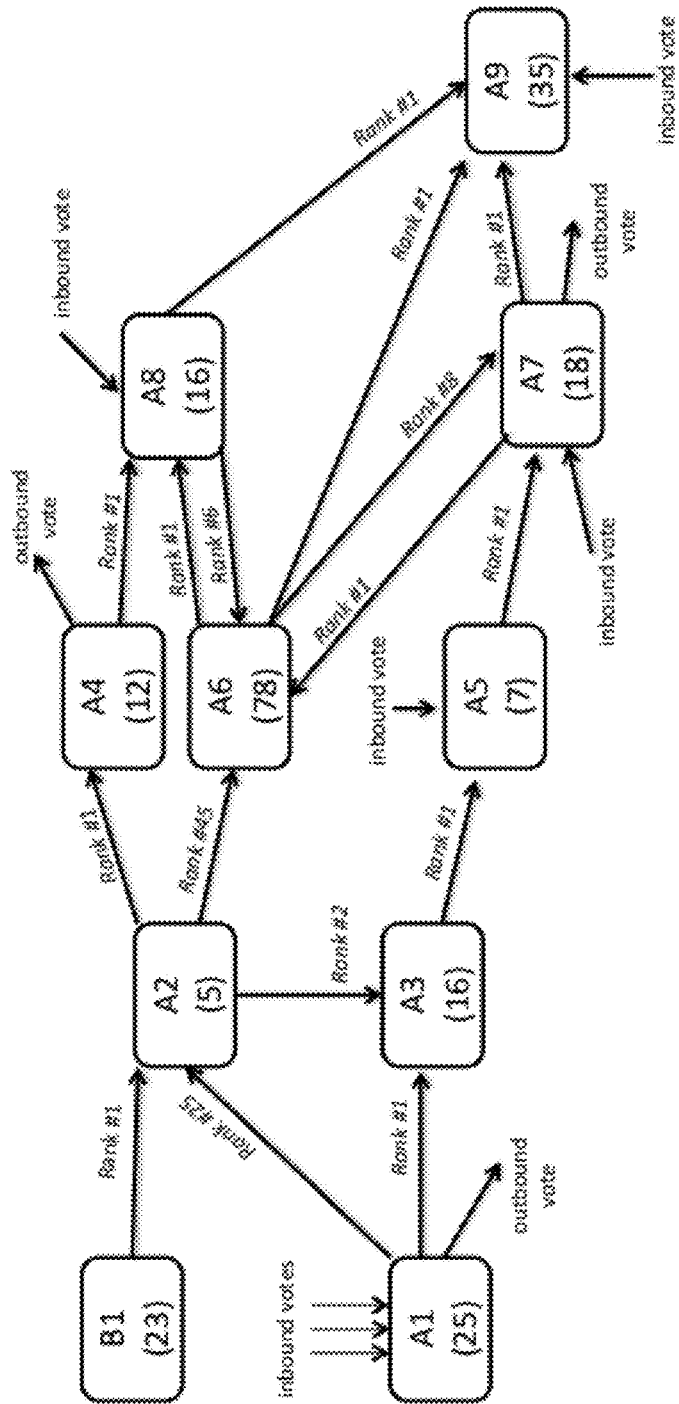

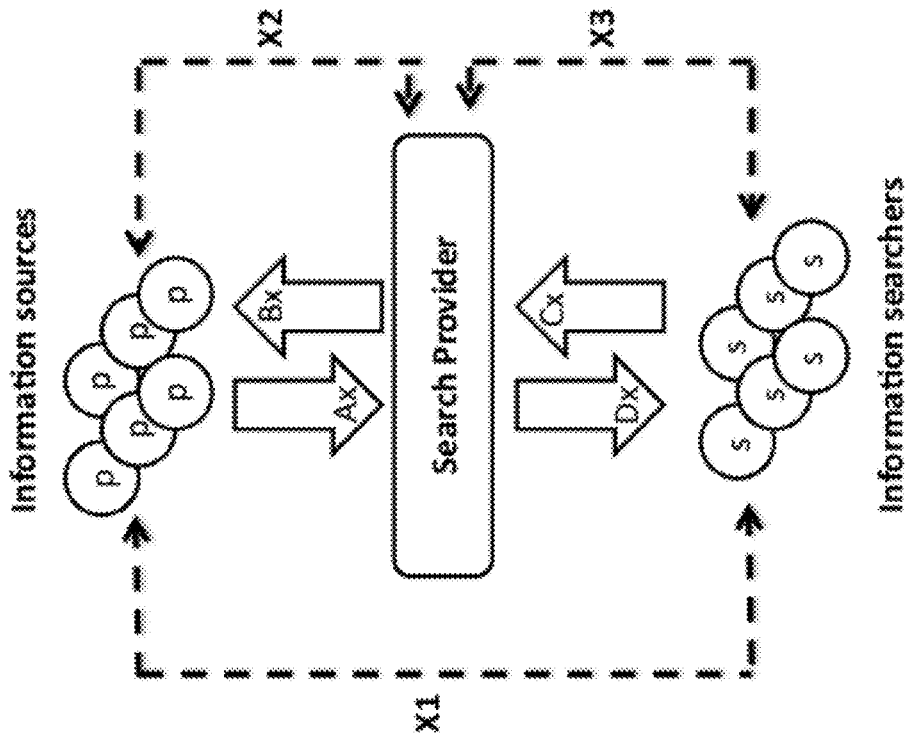
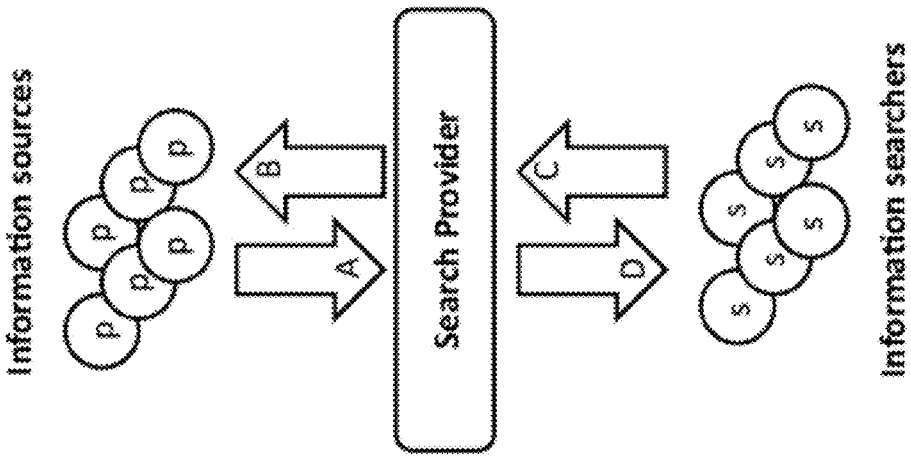

ENHANCED SEARCH SYSTEM AND METHOD BASED ON ENTITY RANKING

BACKGROUND OF THE INVENTION

1. Field of the Invention

One or more embodiments of the invention are related to the field of computer systems. More particularly, but not by way of limitation, embodiments of the invention enable an enhanced search system and method based on entity scoring and ranking configured to provide improved searches through calculation of scalar online and offline user rankings quantified by peer-to-peer voting that are extended through network analysis. In one or more embodiments of the invention, searches for people and information, for example, may employ and enhance offline or physical-world reputation-enabled entity scoring and rankings in online environments and vice versa, which is unknown in the art.

2. Description of the Related Art

Currently known search providers generally do not automatically take into account the preferences of an information searcher beyond that searcher's search request, or the reputation of the sources, which offer the information that is being searched. As a result, not only are searchers offered only limited means for leveraging personal preferences throughout the search process, but they are also unable to conduct searches based on the reputation of information sources or rank information sources based on reputation. A searcher may have some familiarity with certain sources and thus a subjective impression of the sources' reputations or their alignment with the searcher's preferences. However, search providers generally do not offer searchers any means for assessing a large variety of sources whose reputations are objectively quantified and standardized in a way that would enable searchers to compare and rank sources based on specific preferences beyond the search request and/or based on source reputation. More specifically, common types of search providers such as certain Internet search engines sample online user behavior, for example, as represented by the number of searchers, recurring or non-recurring web site visits, page or advertising views, clicks, or "click-throughs". Other Internet search engines utilize evaluations of the types and degrees of connectedness among sites (e.g. as represented through inbound and outbound links) to establish source relevance and quality. Therefore, the operative variables employed by known search engines are ultimately based on the behavior of many online users that is aggregated, evaluated, sorted, ranked, and presented back to users as search-facilitating criteria. Here, source reputation is implicitly relegated to the notion that quantity (e.g. the number of page visits or inbound or outbound links) reasonably approximates source relevance and quality. Moreover, search results are often also manipulated by so-called "search engine optimization" providers. Search engine optimization pursues strategic deployment of online information to improve search engine rankings for paying customers. Thus, inadequate information is commonly provided, thereby diminishing the usefulness of search results.

There are other search systems that establish some kind of source quality through various rating mechanisms. However, these mechanisms are limited in that they permit users to rate only instances of what other users say or do or look like or endorse or buy. The only online environments where users can currently acquire some sort of reputation are systems that track the volume of user activity (e.g. the quantity of information shared) across various social networking sites, or online marketplaces where users are rated primarily by strangers and only with respect to business trustworthiness, that is, the assessment of transaction fulfillment risk. In both settings reputation is confined to the very context in which it was acquired. There is no online place that mirrors the physical world in that people acquire a reputation first and foremost within their social circles and this reputation is then carried forward into the extended networks of their peers, driven by the impact of their peers' reputations. In other words, no online context exists that consistently enables a "real" reputation, or rather a perception of quality that attaches to a person's characteristics or abilities, and that transcends the division between physical and online world because it is tantamount to a personal brand.

As stated, known search systems take into account only narrowly defined types of reputation and largely ignore physical-world reputation. In the physical world, reputation can be defined as an entity's quality or characteristic or ability as perceived by another entity, whereas an entity can be defined as a person, or organization, or group, or object, or system, or concept affiliated or associated with a person, or organization, or groups, or systems, or conceptual representations thereof. Reputation is thus instrumental in shaping an entity's social and personal identity. It would therefore be desirable to provide a search system that defines reputation holistically, enabling the utilization of offline, or rather physical-world reputation in the online world, and providing ways to enhance physical-world reputation using online means. None of the many known Internet-enabled search systems achieve this objective because they employ a definition of reputation that is behavior-specific and tied to a certain context, rather than a definition of reputation that is entity-specific because it is tied to a certain entity's attributes or characteristics.

Collaborative filtering systems employ techniques that draw predictive conclusions based on behavioral patterns that are shared among users. For example, users may be presented with product suggestions that are informed by statistical algorithms extrapolating from past site-specific behavior by other, similar users. As such, search results generated from the perspective of collaborative filtering systems are associated with behavioral similarity among users who are otherwise unfamiliar with one another, and with respect to specific consumption contexts.

There are other online rating or review systems that also draw upon informational relevance of similarity in past or intended consumption behavior among users who are otherwise unfamiliar with one another. As such, reputation refers primarily to degrees of agreement among users with respect to certain qualities of usually unfamiliar third entities. Moreover, online ratings or reviews are frequently based on small samples of user votes because they tend to eschew user data aggregation beyond individual sites. In addition, people with extreme opinions are much more likely than average users to rate or review anything online and the underlying sample sizes are too small to overcome this inherent voting bias and the resulting statistical error, and generate a meaningful level of significance. These problems are exacerbated by anonymity, that is, users cannot easily determine the relevance of other users' ratings with regards to motivation or competence.

As mentioned, electronic marketplaces frequently implement systems that allow users to rate one another with respect to a preceding transaction. As such, search results are presented based on the interaction over time among many users who are otherwise unfamiliar with one another and across many transactions in one particular context.

Other, more sophisticated systems exist that are also predominantly focused on user behavior in electronic transactions. Some of these systems extend beyond a first and/or unilateral layer of evaluation sources by enabling weighted and/or reciprocal exchanges of user ratings. This means the impact of an entity's ratings is influenced by the entity's own rating. However, these systems are also site-specific and merely employ reputation as a transaction risk reduction tool that is based on the degree to which a multitude of users who are otherwise unfamiliar with one another agree on the ratings of other entities over time, and only with respect to certain electronic transactions such as the purchases of goods and services.

In other words, systems conceived to provide user value in electronic transactions or online marketplaces address only transactional fulfillment risk. As such, any related ranking of users would provide user value only for a narrow range of user interactions and for one particular place.

Social networking sites represent a departure from these anonymous single-purpose environments, as they cluster individuals connected through varying degrees of familiarity, often derived from or supplemented by interaction in the physical world. However, such sites entirely relegate the notion of reputation to the physical world, presumably because they assume that offline familiarity among users sufficiently establishes reputation. In addition, such sites also usually provide rudimentary mechanisms that allow users to vote on one another, that is, express agreement about one another's opinions or actions (e.g. through the use of "like buttons") or social media influence, but not usually about user attributes. Also, these mechanisms do not generally allow anonymous voting or weighting and do not mandate reciprocity.

There also exist a multitude of social sites that connect individuals who do not usually know one another for the sole purpose of rating one another's phenotype.

As a result, currently known Internet-enabled systems do not offer holistic implementations of the features that make reputation valuable in the physical world:

Attribute specificity and diversity: addressing one or more specific qualities or characteristics or abilities.

Portability: applying across different environments and contexts (e.g. online and offline, as well as across different settings within each context) that are unified by the attributes under consideration.

Entity dependence: attaching to an entity's public or private persona or image or identity as supposed to an entity's actions in one context.

Weighting by source reputation: it matters whether an opinion about an entity is issued by a source with high or low reputation.

Reciprocity: entities evaluate one another along the same criteria.

Opinion heterogeneity: reputation formation derives from samples that are large enough and diverse enough to address possible statistical errors meaningfully.

For at least the limitations described above there is a need for an enhanced search system and method based on entity ranking.

BRIEF SUMMARY OF THE INVENTION

One or more embodiments described in the specification are related to an enhanced search system and method based on entity ranking. Embodiments of the invention establish rankings of entities derived from opinions of entities about other offline and online entities to form reputations and offer results for a specific search based on the rankings for online or offline entities, comprising features that:

Establish rankings as relating to personal attributes, i.e. qualities or characteristics or abilities, along one or multiple domains, by way of entities voting for one another across these attributes to form domain-specific reputations for online and offline entities.

Utilize various voting methods including, but not limited to, range/scale voting or Condorcet voting or modifications thereof and enable users to function simultaneously as voters and votees.

Calculate rankings recursively based on received votes using un-weighted scoring or weighted scoring associated with user or voter rankings or reputations.

Adjust reputation scores statistically using a multitude of methods including, but not limited to, probability analyses, inferential statistics, or test theory, and a multitude of variables including, but not limited to, demographics such as age or sex or experience, the number of votes placed or received, the frequency and/or duration and/or recentness of user activity, the veracity and/or completeness and/or amount of user information provided, degrees of similarity between voter and votee as determined by other variables and/or the degree of familiarity between voter and votee, and/or voting outcomes across the entire user base and/or user feedback in response to search results.

Establish user reputation as portable between or within the physical world and the Internet to enhance the ability to search in both offline and online contexts.

Establish reputation dissociated from transactional context as a way to enable identity formation.

Enable the derivation of organizational reputation from the reputations of an organization's members.

Enable reputation in and across certain domains such as "computer programming" or "providing investment advice" or "finding great restaurants" based on certain attributes that may be as general as "trustworthiness" or "competence", or as specific as "writing ability" or "aptitude for . . . " (e.g. aptitude for finding great restaurants).

Enable the definition of key attribute categories and reputation domains that are then presented to voters and enable users to suggest and vote on non-key attribute categories and reputation domains.

Enable "agreement paths" throughout the entire user base, derived from a definition of reputation as a measure for expressing co-orientation among users with regards to certain attribute-domain combinations and regardless of the distance among users along such paths.

Enable the clustering users into groups based on the degree of familiarity or agreement among them, or based on reputation domains or attributes.

Enable the generation of domain-specific reputation badges representing reputation rankings or scores, and enabling enhanced searches based on the reputation rankings or scores of users.

Enable the clustering of users into statistical distributions depending on variables such as familiarity among users, or reputation domains or attributes, or voting outcomes, or agreement among users, or user feedback to assess and enhance the validity and reliability of reputation scoring and ranking, or make inferences about certain voting outcomes, or adjust reputation scoring or ranking mechanisms ex post.

Enable a "kudos" feature, allowing users to boost their own reputations' impact on the reputations of others, and limiting use of that feature in time (e.g. once per year) and/or in frequency (e.g. one kudos per user or one kudos per user per month).

Examples of possible voting mechanisms include range voting, i.e., assigning numbers from a quantifiable or numerical scale such as a Likert-type scale, or Condorcet voting by which a voter decides who, among a group of two or more candidates, beats out the others, a voting method frequently used on phenotype rating sites. For example, a Condorcet election that one or more embodiments of the invention may utilize could be the presentation to a voter of a question such as "Whose product recommendations would you rather follow?", along with two photos or descriptions/writings/mentioning of two or more of the voter's contacts from his/her social network. The voter may then vote by clicking on the candidate whose product recommendations she favors.

Embodiments of the invention may calculate votees' rankings via scores that are based on received votes and weight these scores by the reputation scores of the voters. The weights used may be voters' reputation scores for the same domain and attribute or for a more general yet relevant domain or attribute, or a global reputation score that aggregates reputation scores from multiple domains or attributes. Weighting may be simple, using the vote tallies of voters as weights, or weighted using the weighted scores of voters as weights. Scores or ranks may be statistically standardized or normalized, for example by using averages, or adjusted, or transformed, or smoothened in one or more embodiments. Online users may also vote on offline users, enabling offline users to be found via online or offline searches for example. An example of an offline search may be a Smartphone application that shows users, directly, or indirectly via search results that are based on said users' opinions, ranked with respect to a certain domain-attribute combination, and in a certain area without requiring an Internet connection at the time, or without requiring a typical Internet search.

Generally, every voter may also be a votee. As users are connected through a social network structure, whether offline in the physical world or online, they are familiar with the users who vote on them and the users they vote on. However, it may not usually be disclosed to votees who voted for them and how. Instead, only the aggregated results, e.g. votees' reputation scores for a specific attribute in a specific domain, or rankings, or distributions, or summary statistics thereof may be shown to users.

The weighted reputation scores may also be adjusted to address various statistical biases. Such adjustments may involve complex probability analyses including, but not limited to probability theory, test theory, or inferential statistics, utilizing variables including, but not limited to, user-specific data such as demographics, usage behavior (e.g. recentness or frequency of voting), voting outcomes anywhere in the user base, or user feedback in response to certain scoring or ranking outcomes that users learn about via search results that may be provided by third-parties. Voting may also use a time constraint, that is, voters are given only a predetermined amount of time such as three seconds to vote. This prevents rumination or rationalization, both of which distort how a person would likely judge in an everyday context.

Embodiments of the invention provide improved searching based on ranking of entities. Search providers, search engines, online commerce sites, social networking sites (e.g. online dating sites or job sites) that offer search services may utilize embodiments of the invention to incorporate the reputation of an entity into their algorithms, thereby making it much easier to find, for example, meaningful, relevant, or reliable information or content or people, or employees, or entities, or service providers. An entity may be an offline individual or online user such as a blogger, journalist, artist, job seeker, online dater, representative of an organization or corporation, etc., or an organization or service/product provider, or members thereof who may be represented by the aggregate reputation of the individuals who make up that entity.

Embodiments of the invention enable improved search results for critiqued entities. For example, the Internet, and all media for that matter, is filled with rankings, rating, or comments. However, the reputation of the sources behind such opinions is either rarely known or tied to the respective publication platform (e.g. a journalist's reputation often hinges on that of a newspaper). The list of possible applications is long, ranging from consumer product/service/media reviews, over critics such as those for films, restaurants, theater, art, etc., to general advising activities such as those by people offering help to others, etc., and commenting activities. Possible applications exist throughout the offline world as well. For example, local services businesses such as barbershops or spas could market themselves using the reputation of their employees. Moreover, websites that provide rating/reviewing/commenting implementations may employ embodiments of the invention to improve the relevance of such implementations by taking into account the reputation scores or rankings of entities that rate/review/comment. For example, a consumer products company could weigh the aggregate review results for a product by the each reviewer's reputation for being a good product reviewer, or offer ratings that are tailored to the degree of co-orientation (with regards to consumption taste) among different users.

Embodiments of the invention may also be utilized for hiring employees by facilitating the typical matching process for both employees and employers. Every year, firms spend billions to find new employees through job ads, interviews, executive search firms, etc. Empirical evidence suggests that the results leave much to be desired, because despite employers' best efforts, much uncertainty about an individual's abilities remains throughout the hiring process. As a result, many hiring decisions end up being gut decisions and as such they are ultimately very bad at predicting future employee performance. Companies may, for example, utilize embodiments of the invention to search for employees based on the reputation scores of applicants for attributes and in domains that are most relevant to open positions. This makes it much easier to locate relevant candidate expertise that can also be quantified and benchmarked internally (i.e. compared with current employees) and externally (i.e. compared with other applicants) quickly and easily, while reducing the need for subjective and inefficient candidate evaluation processes such as resume scanning. In fact, companies may utilize embodiments of the invention to keep abreast of the career progress of potential employees who represent the right combination of expertise and fit, without the need for launching or funding an actual hiring campaign. Similarly, as the same occupation may provide very different experiences depending on the firm, job applicants may use embodiments of the invention to gauge vague and hard-to-communicate concepts such as company culture to get a sense of what it would really be like to work at a particular company. Companies on the other hand may utilize embodiments of the invention to determine their employees' collective reputation in relevant categories such as "work ethic" or "collegiality" and benchmark such categories against competitors. Of course, this same rationale can be applied to internal evaluation. For example, instead of hoping its mission statement holds, a company may determine what its culture really looks like behind the scenes, how it evolves, and which areas need improvement. Companies may also employ embodiments of the invention as performance evaluation tool to rank employees against one another and to identify strong performers or people who may be in the wrong position, team, etc. Again, this is particularly valuable because of the need for large, diverse, and independent opinion samples—employees' performance assessments are no longer just based on the ratings of three or four immediate colleagues but based on true instances of reputation that are influenced by the perceptions of many more colleagues, even prior colleagues at other firms, or other individuals whose opinions are relevant to such an evaluation. Likewise, large sample sizes also enable much more holistic evaluations of job applicants, as hiring decisions need no longer be based solely on a combination of interview, resume, and references or recommendations. Put differently, an employee's or job applicant's reputation score or ranking for attributes such as "competence" would reflect that individual's competence throughout her entire career, thereby functioning like an objective letter of reference encompassing all of the applicant's past jobs or work related efforts. Naturally, this logic can be extended to academic selection or any other human capital assessment or selection process as well.

Embodiments of the invention may quantitatively and measurably connect and rank all users regardless of how far apart they are, thus representing a potential empowerment tool, a way to "meritocratize" society using the power, reach and connectivity of the Internet. Embodiments may therefore give a voice to people whose voices have previously gone unheard, yet unjustifiably so, for example because they lack the credentials for a particular domain. For example, one might find out that an unknown blue-collar worker's restaurant recommendations are relevant to a wider audience than, for example, those of a famous food journalist. More specifically, embodiments of the invention enable users to compete against one another in particular domains, thereby offering them opportunities to make a living using verified and benchmarked expertise, even though their real-world credentials would have never suggested it or given them the chance to prove themselves.

For example, assume said blue-collar worker, named Bob, had a good friend, Mark, who knew that Bob's expertise in identifying hidden gem restaurants was second-to-none. Now, Mark may talk to other people and tell them about Bob or relay Bob's "foodie recommendations", but that may never benefit Bob. But if both used an embodiment of the invention, the story may unfold completely differently. Let's assume Bob may only know other blue-collar workers, but Mark has a more diverse social circle. Now, assume Mark rates Bob's foodie skills (Condorcet example: "Whose restaurant recommendations would you rather follow?") superior to those of all the members in his social network. Among these people is one lady, Erica, a rather renowned foodie herself, who happens to be connected to Samantha, a well-known food journalist. By virtue of her profession and her social circle, Samantha fetches a very high foodie reputation score. However, Samantha also thinks very highly of Erica's foodie skills and actually rates her above some of her other high-powered food journalist friends. Thus, via weighting, Erica's reputation in the foodie domain will be infused with Samantha's foodie reputation. Now, as long as Mark receives at least one vote from Erica, his foodie reputation will benefit as well. But because Mark knows of Bob's outstanding talent, he will surely vote for Bob in that domain, maybe even rating Bob's foodie skills atop all of his personal contacts. That way, Bob will be able to benefit from the connection to Samantha via Erica and Mark, and be able to garner some of the reputation of Samantha, thereby "climbing the ladder" and earning a higher reputation score without having to know Samantha personally or be connected to her social network. In fact, the more highly all her reputed food journalist-friends rate Samantha, the better Bob will do. Of course, his ascent is mitigated by the influence of Mark's and Erica's reputations as well. But the general logic holds—embodiments of the invention connect people across multiple degrees of separation in a standardized and quantitative way, allowing them to "benchmark" directly and indirectly against one another. Embodiments may also employ statistical analysis that may show that, across his own social network, Bob appears on top of more foodie recommender lists than his reputation suggests, thereby triggering an additional reputation bump in this domain. In addition, Mark may decide to bestow his only yearly "Kudos" in the foodie onto Bob, thereby boosting the impact of his own reputation on Bob's reputation and further lifting Bob's score. As Bob's network grows he can continually improve his score and use his reputation to advertise, for example, on his own foodie blog, eventually becoming a part-time food journalist himself. In addition, Bob's recommendations may also show up as weights or multipliers with respect to Bob's restaurant reviews on third-party sites. For example, Bob may rate a certain restaurant as having five stars using a restaurant site that employs embodiments of the invention in its rating algorithm. This means that Bob's five-star rating may be weighted utilizing Bob's foodie score or ranking, thereby impacting the restaurant's overall rating more than the ratings of people with lower foodie reputation (but less than the people with higher foodie reputation). Now, as users actually frequent the restaurant, for example because of its ratings on said site or because it had shown up in a relevant search through a search provider employing embodiments of the invention in its rating algorithm, they may use embodiments of the invention to provide feedback about whether their pre-dining perception of the restaurant aligns with their actual eating experience. This feedback may then be used to further calibrate the rating and scoring methodology that embodiments use and enhance or confirm or mitigate Bob's rating influence and thus, his scores and ranking.

BRIEF DESCRIPTION OF THE DRAWINGS

The above and other aspects, features, and advantages of the invention will be more apparent from the following more particular description thereof, presented in conjunction with the following drawings wherein:

FIG. 8 illustrates an embodiment of score calculations for a group of users connected through overlapping social networks.

FIG. 9A illustrates an embodiment of the propagation of entity ranks and reputations across social networks via shared network users, and how the resulting structure can be used to establish co-orientation, or rather, "agreement paths" among all entities.

FIG. 9B expands on the notion of agreement paths.

FIG. 10A illustrates simplified, typical search relationship architecture.

FIG. 10B illustrates the same architecture and how it is enhanced by embodiments of the invention.

DETAILED DESCRIPTION OF THE INVENTION

An enhanced search system and method based on entity ranking will now be described. In the following exemplary description numerous specific details are set forth in order to provide a more thorough understanding of embodiments of the invention. It will be apparent, however, to an artisan of ordinary skill that the present invention may be practiced without incorporating all aspects of the specific details described herein. In other instances, specific features, quantities, or measurements well known to those of ordinary skill in the art have not been described in detail so as not to obscure the invention. Readers should note that although examples of the invention are set forth herein, the claims and the full scope of any equivalents are what define the metes and bounds of the invention.

Figure 1:
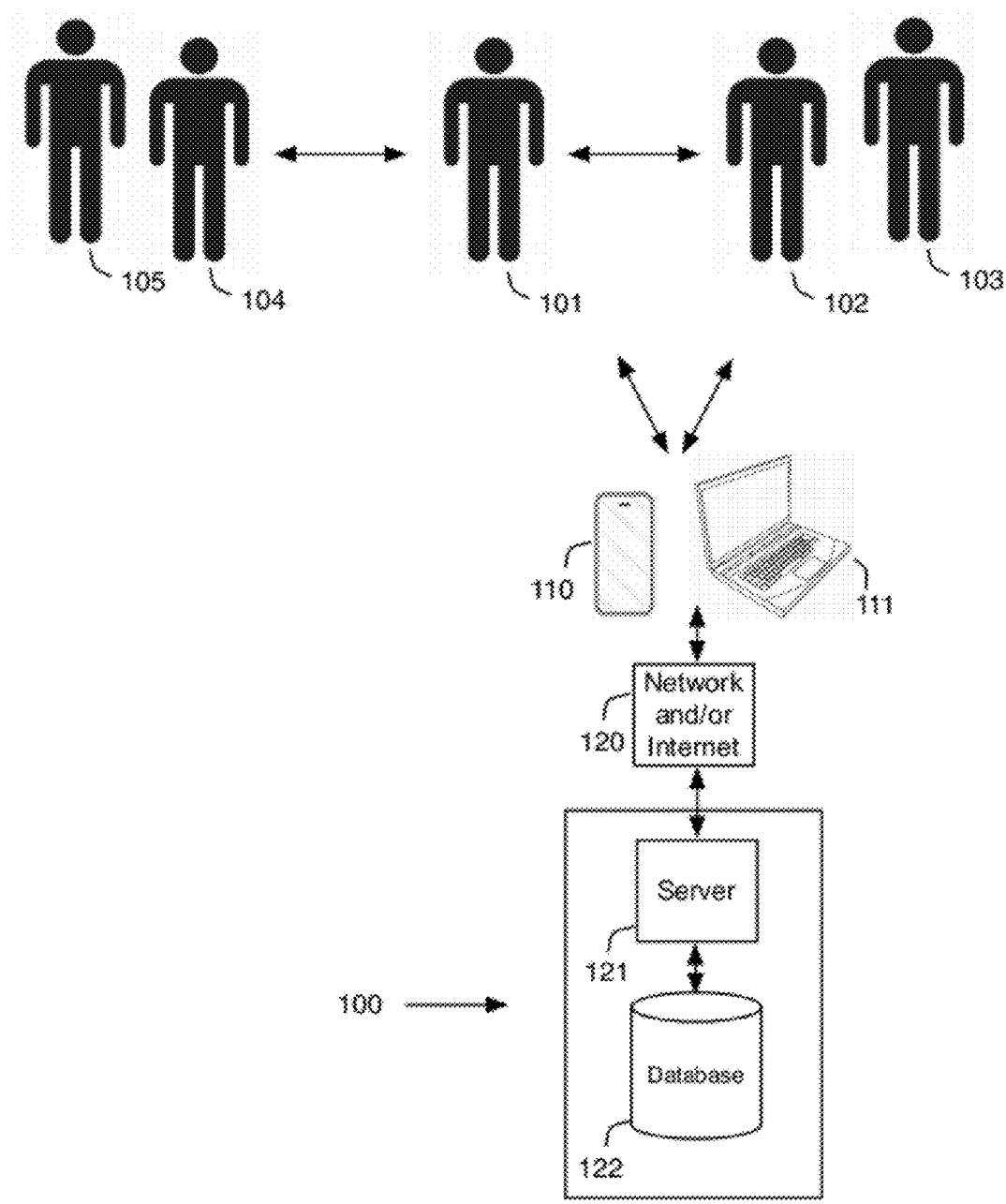
FIG. 1 illustrates an architectural view of an embodiment of the invention.

FIG. 1 illustrates an architectural view of an embodiment of the invention. As shown, users 101 and 102 may utilize mobile computer 110 such as a cell phone, or computer 111 to vote on attributes related to one another. If users 102 or 103 represent the entirety of an organization or group, then user 101 may vote on users 102 and 103, thereby partially voting for the organization or group. Similarly, users' 102 and 103 reciprocal voting for user 101 may represent the organization's or group's partial voting for user 101. Users 102 and 103 are referred to as online users, as they may vote for user 101 using, for example, mobile computer 110 and/or computer 111. However, they may also vote using, for example, mobile computer 110 and/or computer 111 without an Internet connection, or any other means. User 101 may also vote for users 104 and/or 105 who exist in the physical world but who are offline users who may or may not have access to the Internet. The votes from user 101 for users 104 and 105 may, for instance, be based on their attributes (e.g. competence) in a particular domain (e.g. computer programming). Users 104 and 105 may also form a combined entity, group, or organization even though they may not be "online" users. Users 104 and 105 may also vote for user 101 through the mail, via the telephone or in any other manner that does not require an Internet connection. The votes from users 101-103 may directly enter system 100 via network and/or Internet connection 120. Votes are accepted by server 121 and typically stored in the memory associated with server 121 and/or in database 122. Votes from users 104 and 105 may be accepted via server 121 or telephone interview or postal questionnaire or any other offline method of gathering individual opinion. Incentives may be utilized to obtain input from users 104 and 105 and/or users 101-103 as well. Server 121 is typically implemented with a central processing unit, or CPU. Software residing in the memory on server 121 is typically configured to implement an enhanced search system and method based on entity ranking.

Figure 2:
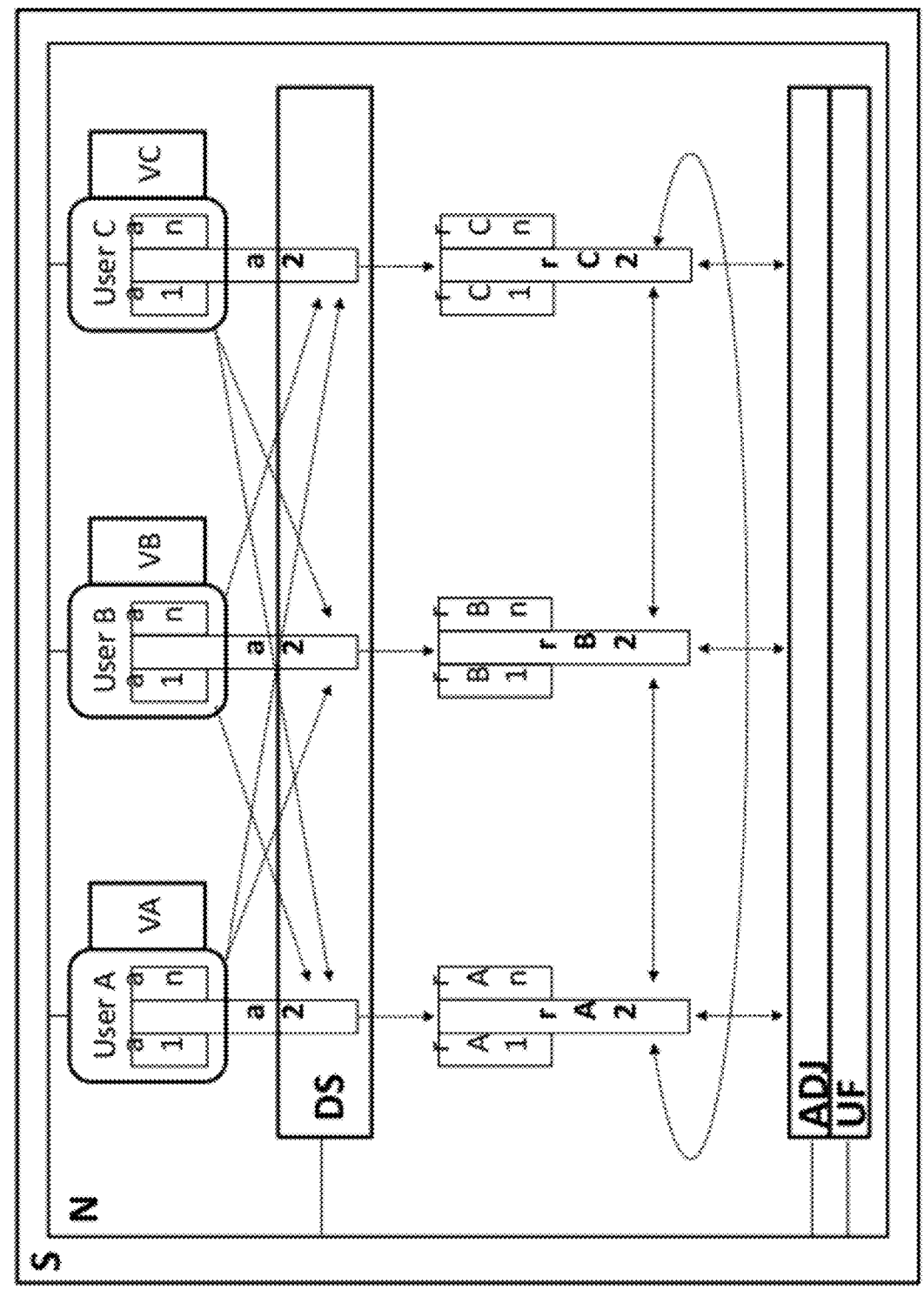
FIG. 2 illustrates a logical view of an embodiment of the system.

FIG. 2 illustrates a logical view of an embodiment of the system. Within the system (S) lies a user network (N), which may comprise a single social network or a plurality of associated social networks. Within network N, user A can be perceived as a locus of unique user variables (VA) such as demographics or usage behavior, and universal user attributes (a1, . . . , an) such as competence or trustworthiness. User A is connected directly or indirectly to other users (B, C) via the system and shares with them said attributes with respect to a locus of reputation domains (one of which may be computer programming) represented by a common domain space (DS). Users A, B and C may represent any of users 101-105 as shown in FIG. 1. Ex-post adjustments may be provided via an adjustment mechanism (ADJ) employing a variety of statistical tools and via a user feedback (UF) mechanism.

Users are articulated within the system through unexpressed reputations, that is, attribute-domain combinations (e.g. competence in computer programming) that can be expressed through voting by other users. Reputation (rA1) therefore represents an unexpressed attribute a1 (e.g. speed) for user A in a particular domain (e.g. typing). Now, users B and C choose a domain (e.g. computer programming) and vote on A's attribute a2 (e.g. competence) relative to this domain, thereby expressing A's reputation (rA2) in said domain. This reputation is then weighted by the expressed reputations rB2 and rC2 belonging to voters B and C, respectively, and representing B's and C's reputations for attribute a2 in the same domain (i.e. B's and C's competence in computer programming). System S then calculates weighted scores and relative ranks associated with the reputations rA2, rB2 and rC2. In addition, an adjustment mechanism (ADJ) may adjust the weighted reputations rA2, rB2, and rC2 using statistical methods such as standardization, transformation, test theory, probability analysis, or inferential statistics, using user variables (VA, VB, VC) or expressed reputations (rA2, rB2, rC2) or user distributions and ranks or ex-post user feedback. System S then returns the adjusted reputation scores or ranks as search results in response to a user's or electronic system's relevant search request. Moreover, embodiments may return results regardless of whether the involved users are online users or offline users, and results may differ based on the type of information sought. For example, if a person is the object of a search, as would be the case when searching for a competent computer programmer (in the user network), embodiments may return a relevant person's available scoring or ranking information. When searching for general data or information, for example with respect to assessing the quality of a place or service or product, embodiments may directly return results that are already informed by user scoring or ranking, without the need for displaying all the underlying user scores or ranks that generated the desired information. Additional feedback, for example on user A's computer programming skills may also be provided later, for example, by user A's manager who also uses the system and who may or may not have voted for A initially. This feedback may then be used to further adjust rA2.

For example, if user 102 is performing a search for a restaurant in a given area on mobile computer 110, embodiments of the invention analyze all users who are scored with regards to their competence for recommending restaurants, then rank these users, and return the findings as search results. Results may comprise users ranked with regards to their competence for recommending restaurants, and/or their degree of co-orientation with user 102, or restaurants with user reviews which already incorporate the impact of the reputations of the underlying reviewers via implementations of embodiments of the invention in the algorithms of the respective review platform, or users ranked with regards to their competence for recommending restaurants that fit the taste of user 102 as identified through "agreement path", or rather, co-orientation analysis, that is, the analysis of the propagation of user ranks and reputations across social networks via shared network users (compare FIGS. 9A-B), or restaurants with user reviews which already incorporate the impact of the reputations and agreement paths of the underlying reviewers via implementations of embodiments in the algorithms of the respective review platforms. Results may be presented to users in various output forms that may be directly provided by embodiments of the invention or by third-parties such as those operating restaurant review websites that utilize implementations of the invention. For example, user 101 may be identified by embodiments of the invention as the most competent restaurant recommender available and/or the most competent restaurant recommender relative to the searcher's preferences. Consequently, a map displaying restaurants that user 101 recommends may be shown as a search result. User 102 can also display the recommendations of lower-ranked users or see recommendations aggregated across multiple users. For instance, the restaurant recommended by the top-ranked user may be shown with the largest icon, while the restaurant recommended by the second-ranked user may be shown with a smaller icon.

Figure 3:
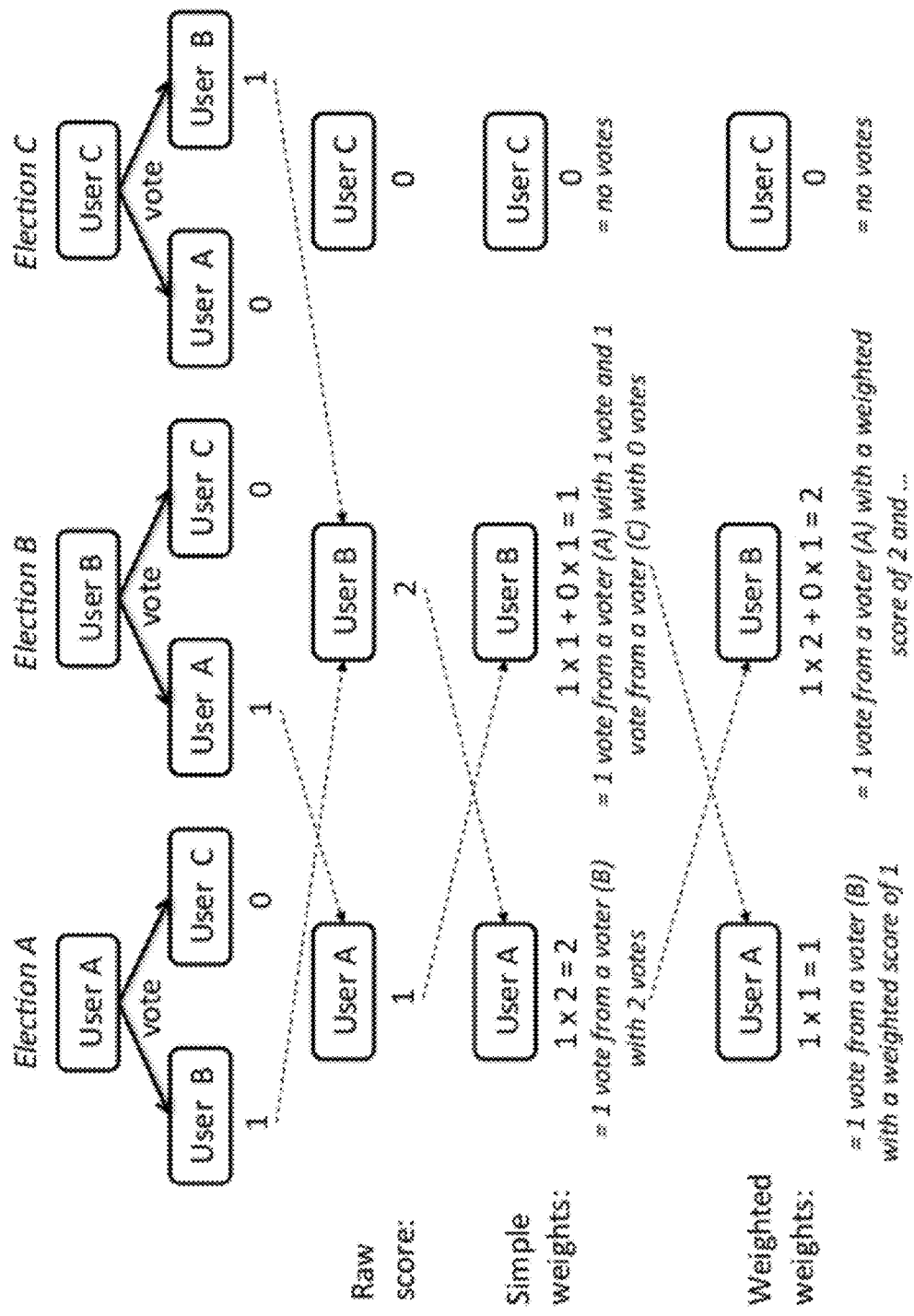
FIG. 3 illustrates a three-user universe with modified Condorcet voting, different weighting methods, and no additional statistical adjustments.

FIG. 3 illustrates a universe of three users (A, B, and C), employing Condorcet-type voting for one domain, different weighting methods, and no additional statistical adjustments. The system establishes, through manual input or by importing from other sources such as social networking accounts, an online account containing user data for each user, as well as a personal contact database such as the one stored in database 122 shown in FIG. 1. For example, in A's database are now users B and C. Server 121 accepts user A's votes on users B and C within and across different, selectable domains and for a variety of possible attributes such as trustworthiness, professional expertise, quality of writing, quality of restaurant or movie recommendations, knowledge about vintage cars, etc. The system also accepts votes from users B and C. As all users may vote on their peers, reputation scores may be generated for each user. Generally, embodiments of the invention may not inform users who voted for them and how. Each voter's vote is then weighted by the voter's own reputation score, using simple weights or weighted weights. This means a vote from a user with a high reputation score carries more weight than a vote from a user with a low reputation score. Embodiments of the invention may then further adjust reputation scores using various statistical analyses that utilize a multitude of system or user variables and that are intended to reduce statistical error or bias and increase system performance. The system then ranks the related reputation scores to provide thus improved search results that satisfy the preferences of the users who are searching. Results may show user scores or ranks, or output that is informed by user scores or ranks Embodiments of the invention may also report the depth of a user's influence throughout an online or offline network by reporting the length of said user's agreement path. For example, in addition to returning a score or rank, some searches may benefit from letting a user know how many other users can be impacted (e.g. "this user's restaurant recommendations are relevant for 500 people"). Embodiments may also report results that consider a user's preferences as represented by "agreement paths", that is, the propagation of user ranks and reputations from the user, across the user's social network, and into other social networks (compare FIGS. 9A-B). As shown, user A votes for user B over user C for a given attribute in a particular domain. This means that user A believes that user B is better at or more reputable than user C for said attribute in said domain. Likewise, user B votes for user A over user C for said attribute and in said domain. For example, users A and B may consider each other most competent (attribute) at picking restaurants (domain), while user C would prefer to follow user B's restaurant recommendations over those of user A. Hence, in one embodiment employing a Condorcet voting scheme, user A receives 1 vote, user B receives 2 votes, and user C receives no votes. Simple weights may be calculated as the sum of the products of the number of votes for a user and the number of votes a voter has received. As shown in the "Simple Weights" row, user A receives one vote from B, which is then multiplied with the 2 votes that B has received, thereby weighting B's vote for A by B's own vote tally. This simple weighted score may also be utilized to determine the final reputation score of 1 for user B, which derives from the sum of A's vote for B, multiplied by A's vote tally of 1, and C's vote for B, multiplied by C's vote tally of zero.

Figure 4:
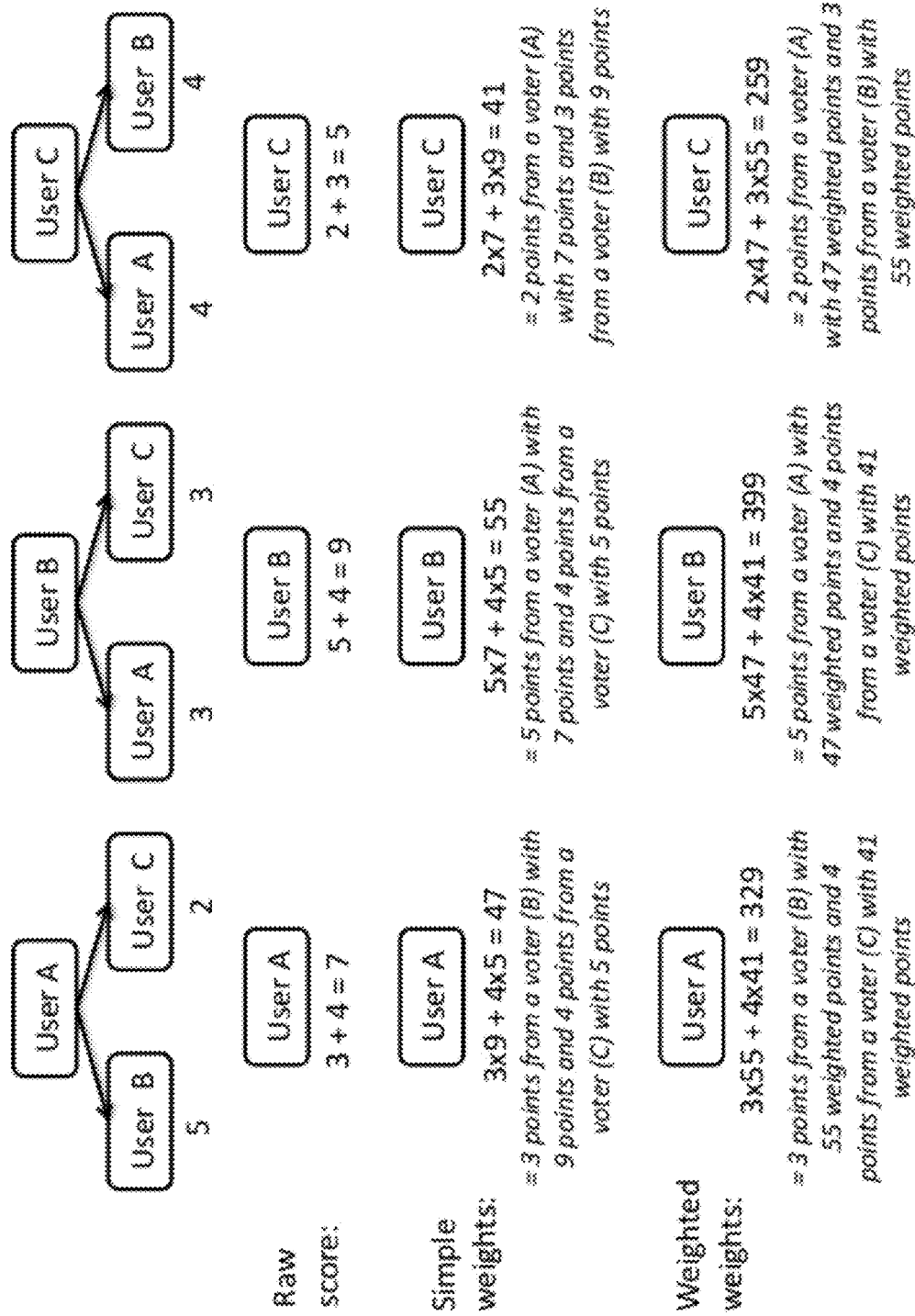
FIG. 4 illustrates a three-user universe with range voting, different weighting methods, and no additional statistical adjustments.

FIG. 4 illustrates a three-user universe with range voting for one domain, different weighting methods, and no additional statistical adjustments. In one or more embodiments, range voting or any other voting scheme may be utilized instead of, or in combination with, Condorcet voting as shown in FIG. 3. As shown, user A receives points from users B and C of 3 and 4, respectively, for a given attribute in a given domain for a raw score of 7. The simple weighted score is also calculated by summing the products of the received points and the voters' own point tallies. User A's simple weighted score is therefore 3*9+4*5=47. A's simple weighted score is utilized to determine the "double weighted score" (i.e. scoring in combination with weighted weights) for user B. More specifically, B receives 5 points from user A, which are weighted by A's own weighted score of 47, and 4 points from C, which are weighted by C's own weighted score of 41, resulting in B's total double weighted score of 399 points. Embodiments of the invention may also standardize results using simple weighted and double weighted means, as well as adjust results using a variety of statistical methods such as log transformation or probability analyses within the user system.

Figure 5:
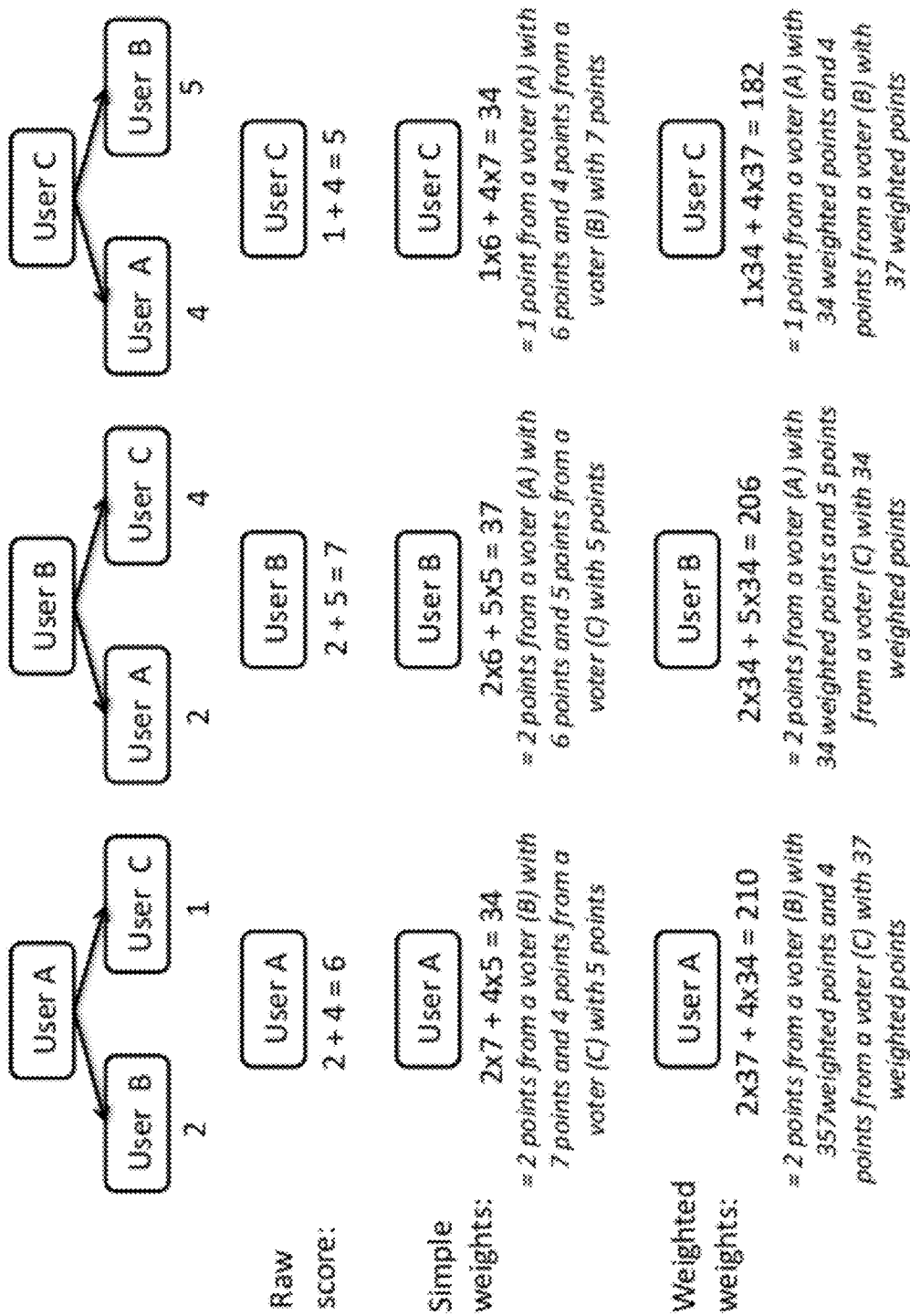
FIG. 5 illustrates a three-user universe with range voting, different weighting, no additional statistical adjustments, and with different voting values with respect to FIG. 4.

FIG. 5 illustrates a three-user universe with range voting for one domain, different weighting methods, and no additional statistical adjustments with different vote values as opposed to the votes shown in FIG. 4.

Figure 6:
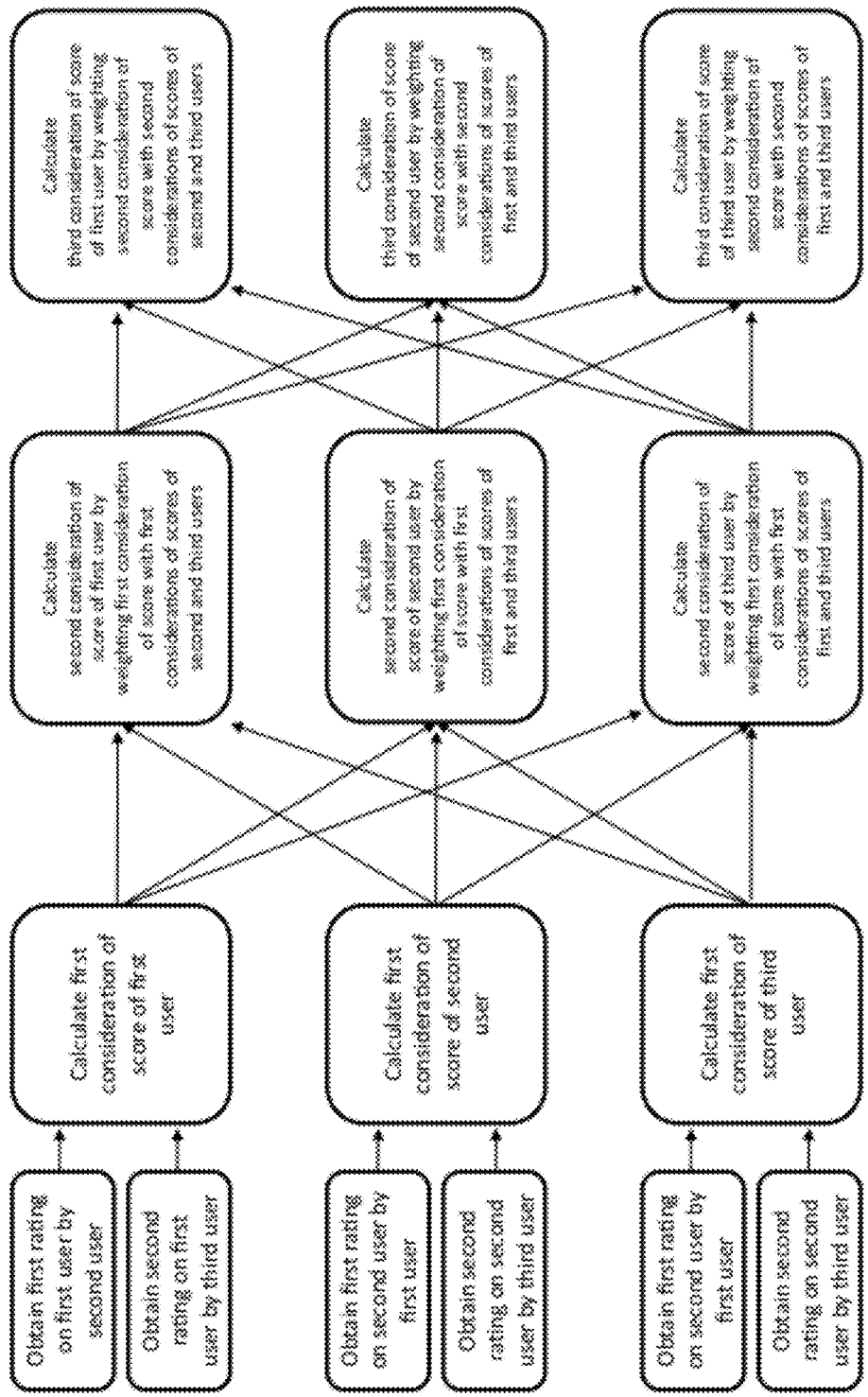
FIG. 6 illustrates an algorithm flowchart for a three-user universe with generic weighting and no additional statistical adjustments.

FIG. 6 illustrates an algorithm flowchart for a three-user universe for one domain, different weighting methods, and no additional statistical adjustments. Ratings or points or votes are accepted by the system for users with respect to other users on the left side of the figure. The process of generating simple weighted scores and double weighted scores is shown traversing FIG. 5 from left to right.

In one or more embodiments of the invention, a user Y's mean raw reputation score ($S_Y$) may be calculated as:

$$S_Y = (\Sigma_{i=1}^n v_i)/N$$

wherein $v_i$ is a vote cast for user Y by voter i, and N is the number of elections in which the user participated (i.e. the number of voting actions involving the user as a votee, regardless of whether the respective votes were cast for or against the user).

User Y's mean weighted reputation score using voters' reputation scores as weights ($SW_Y$) may be calculated as:

$$SW_Y = (\Sigma_{i=1}^n v_i \times S_i)/N$$

wherein $S_i$ is the mean raw reputation score of voter i.

User Y's mean weighted reputation score using weighted reputation scores as weights ($SWW_Y$) may be calculated as:

$$SWW_Y = (\Sigma_{i=1}^n v_i \times SW_i)/N$$

wherein $SW_i$ is the mean weighted reputation score of voter i.

An alternate embodiment of the user Y's mean weighted reputation score may be calculated using a log function as follows:

$$SWW_Y = \log[(\Sigma_{i=1}^n v_i \times SW_i)/N]$$

wherein the log function is utilized to improve the distribution of the results.

Regardless of the exact type of calculation utilized, the reputation for a particular attribute in a particular domain may be ranked by the system and the ranks displayed in response to a search from a given user or third-party entity or system in order to provide targeted and enhanced search results that take into account the preferences of the user as well as the quality/reputation of the information sources that underlie the search.

The reputation values that are ranked fulfill all of the following:

Attribute specificity and diversity by addressing one or more specific qualities or characteristics or abilities.

Portability by applying across different environments and contexts.

Entity dependence by attaching to an entity's public or private persona or image or identity as supposed to an entity's actions in one context.

Weighting by source reputation.

Reciprocity since every voter can also be votee.

Opinion heterogeneity, as reputation formation derives from samples that are large enough and diverse enough to address possible statistical errors and that extend beyond a first social networking layer into and throughout further networks.

Implications of Weighting:

The quality of a voting source matters.

Users need not be directly connected or even online in order to have impact on one another's reputations.

A votee can be rated by a small number of voters and obtain a reputation that will still be based on a large enough sample, as long as the reputation of one or more of the voters derive from large enough voter samples.

In a domain that suggests that reputation can be better interpreted as co-orientation among voters and votees, weighting enables "agreement paths", that is, the grouping of users by agreement throughout and beyond a single social network, because people are more likely to vote more favorably for those people with whose tastes they agree.

Figure 7:
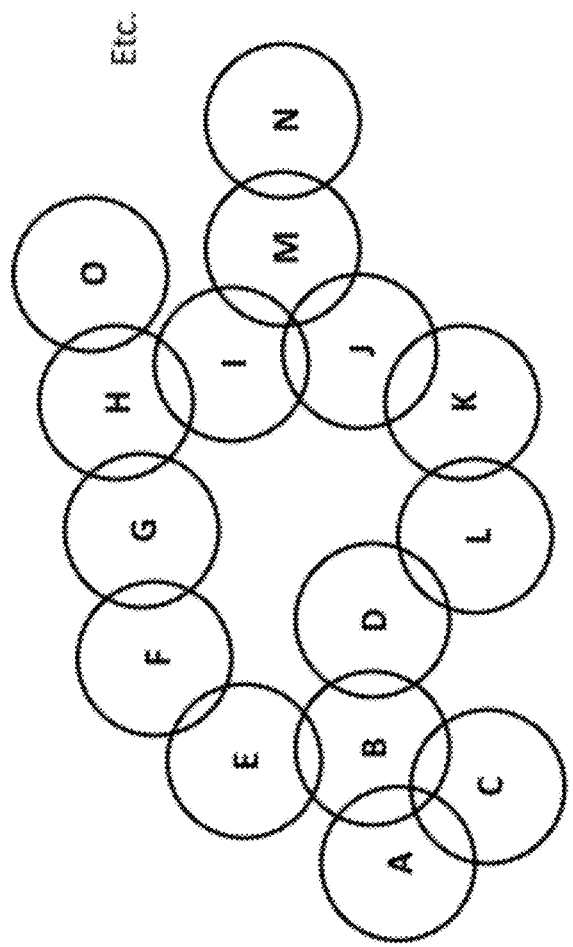
FIG. 7 illustrates the overlap of social networks via shared users.

FIG. 7 illustrates the overlap situation common to user connections across the boundaries of disparate social networks. Many social networks (A-O) overlap, i.e. they have in common one or more members, thereby hypothetically connecting all users across all social networks (the so-called Small World Phenomenon). Assuming that any additional social connection generates at least some additional information value for a social network user, this suggests that any social network user possesses theoretical access to a great deal of information that she cannot fully utilize unless she manages to connect to all other social network users. Embodiments of the invention therefore allow the user to realize some of this theoretical informational value without requiring the user to connect to any new social network user, because reputation-weighted reputation scores and ranks access and transport information across social network boundaries as quantitative data. In other words, as relations tend to develop among socially similar individuals, people will experience many information redundancies in their social networks. By creating a ripple effect that moves certain information across the boundaries of social networks in circles of decreasing familiarity, embodiments of the invention may substantially enhance any user's information access without compromising social network efficiency or effectiveness. As stated, known search providers do not presently provide a comparable level of information access because their search systems focus solely on analyses of user behavior or search environment.

FIG. 8 illustrates an embodiment of score calculations for a group of users connected through overlapping social networks. Voting occurs within each social network and propagates, from right to left, into an adjacent social network via shared users. For illustration purposes these shared users (i.e. Mark, Erica) are also the top ranking users for a specific attribute (e.g. competence) and domain (e.g. restaurant recommendations) in their own respective social networks. For example, within her social network, Samantha rates Erica her top foodie friend. Likewise, in her social network, Erica rates Mark as her top foodie, and Mark rates Bob as his top foodie in his social network. Also assume that each social network contains only two contacts and that each person is only voted on by two people in total. Via weighting, Samantha's reputation impacts that of Erica, which impacts that of Mark, which impacts that of Bob. For Bob, this means that without the indirect connection to Samantha he could have received a maximum of 10 points from Mark. With that connection however, Bob was able to garner an additional 26 points. For standardization purposes, final weighted scores are averaged across the number of voters.

FIG. 9A illustrates an embodiment of the agreement paths for two social networks as linked by one user. Social network A (represented by users A1, A2, A3, and L4) and social network S (represented by users S1, S2, S3, and L4) are ultimately connected via user L4 who links the two networks, with the arrows indicating a possible voting direction. Weighted scoring enables quantifiable reputation path connections, in any direction, among members of A and S that can also be interpreted as the strength of co-orientation, or rather, agreement among members along the path. For example, as S1 votes on all members of his contact database, with S2 receiving the highest vote for a particular attribute-domain combination (e.g. competence in making restaurant recommendations), the connection between S1 and S2 could be interpreted as a connection along a path of agreement between S1 and S2, with S2's score or rank indicating the strength of this connection in the direction from S1 to S2. Consequently, the strongest such "agreement path" is represented by the path connecting the highest scoring or ranking (based on voting) members of each network in a particular voting direction. The strength of this path may or may not be the same as the strength of the path in the opposite direction (for example, S2 may not make S1 his top choice). As a result, when searching for a restaurant using embodiments of the invention, users S1-3 can benefit from the impact of the preferences of users A1, A2, A3, and L4 without having to know them or their preferences directly. The same holds for members of social network A who can similarly benefit from the impact of preferences of members of S. Put differently, by being able to utilize the information along the strongest such agreement path, any member in network S or network A can reap the benefits of relative preference analyses in network S and in network A. The benefits that embodiments of the invention confer can thus materialize, regardless of a particular network structure or voting direction, within a social network, as well as across social networks, because weighted voting not only carries voting information from one network to another via users who are shared by more than one network, but also quantifies and makes comparable all underlying network connections. Therefore, the total population of users that may be connected through any possible agreement path need not be delimited by any pre-existing notion of a social network and could thus be referred to as an "agreement cluster", that is, a locus of individuals who possess some amount of co-orientation that embodiments of the invention can measure.

FIG. 9B expands on the notion of agreement paths throughout a more complex network of users, regardless of pre-existing social network boundaries. An agreement path can have any length, for example, extending from user A1 to user A3, or from user A1, over users A3, A5, A7, A9, A8 all the way to user A6, or in the opposite direction. Thus, there can be multiple paths connecting two or more users, and users need not be directly connected or even votees or voters to benefit from embodiments of the invention. For example, B1 may still be able to benefit from her connection to A2 and the resulting agreement path, without having to be voted on. Likewise, user A9 does not vote but still may benefit from receiving recommendations from users A1 or A2 or A8, who each share one or multiple agreement paths with A9. The value of an agreement path on which a certain unit of information (e.g. a restaurant recommendation) travels towards a recipient quantifies the benefit to that recipient, because it quantifies the degree of co-orientation of members along the path. Embodiments of the invention utilize different ways to calculate such a value, including, but not limited to, maximizing or minimizing or statistically optimizing the sums or averages of ranks or scores or scores per rank, or minimizing the variations in scores or ranks, etc. This may also include the ongoing customization of agreement paths based on user feedback to calibrate search result to better fit individual user preferences. For example, an agreement path could be quantified along A2-A4-A8-A9 as the rank-minimizing path, that is, the path connecting all top-ranked users. Users along this path may thus find one another's restaurant recommendations valuable. Similarly, the path A2-A6-A8-A9 would maximize the weighted scores of members along the way. However, A6 ranks very low for restaurant recommendations in A2's contact database. This means that A2 has voted many of his other contacts above A6. That does not mean, however, that A2 may not be interested in recommendations, for example, from user A7 who shares with A2 several agreement paths, only some of which include A6. Embodiments of the invention may therefore seek out an optimal path, whereas path optimization may employ a plurality of statistical techniques that seek to balance scores and ranks and the various relationships among them.

FIG. 10A illustrates typical search relationship architecture. Information sources (p) publicize information (A) that is then crawled and/or indexed (B) by a search provider. Information searchers (s) send information requests (C) to the search provider. The search provider then analyzes the requests and returns search results (D) to the searchers. As stated, the search provider's analysis does not usually extend beyond user behavior or various quantitative assessments relating to users (e.g. page visits) or system structure (e.g. measures of connectedness among different sites). FIG. 10B illustrates an embodiment of the invention that adds the reputation of information sources and searchers to this relationship architecture to enhance results for all participants. Information sources may now publicize information that includes their own reputation, augmenting process A to Ax. Search providers may now take into account source reputation and improve their data analysis processes from B to Bx, to provide information searchers with enhanced search results Dx. Moreover, search requests C can now consider the reputation and/or co-orientation of both information sources and information searchers via process Cx, which enables better assessments of user preferences, regardless of whether these users are information sources or searchers. In other words, embodiments of the invention can refine critical processes for all participants in a search. As shown by implementation X1, in addition to enabling information searchers to search databases of information sources directly, embodiments may be implemented by embedding scoring or rank data into publicized information, for example via badges or site metadata or content, to enable detection by the algorithms of search providers (e.g. a search engine or a rating/review platform). Alternatively, or in addition, as shown by implementation X2, embodiments may also be implemented via application programming interfaces with a search provider. Alternatively, or in addition, as shown by implementation X3, embodiments may also be implemented by leveraging directly the score or rank information of information searchers, for example, via searcher accounts with the search provider, or via the use of web cookies. Any embodiment implementation may also enable highly preference-oriented searches by visually differentiating among "agreement clusters", or rather, groups of users that possess certain degrees of co-orientation. Embodiments may, for instance, assign a visual marker such as a color or shape or number to a specific attribute-domain combination (e.g. competence in restaurant recommendations) for a specific agreement path. This enables users to scan search results for the visual marker without requiring a web cookie or an account with the search provider to determine to which agreement path a searcher belongs. For instance, assume searcher S, as a user of the system, is directly connected to her contact database through her user account, as is each of her contacts to their respective contacts. Through voting, S then becomes indirectly connected to all of her contacts' contacts, their contacts, etc. The voting itself quantifies searcher S's degree of agreement with her contacts and the voting of her contacts propagates agreement throughout their networks, etc. As a result, multiple agreement paths arise, i.e. different measures of co-orientation between S and every other user of the system emerge, starting with S's immediate contacts and rippling into the entire user network. Specifically, S's search for a good restaurant would take place as follows:

S rates all of her contacts in her contact database via voting (Condorcet example: "Whose restaurant recommendation would you rather follow?").

S's contacts and their contacts do the same in their respective contact databases, thereby creating a social network that transcends the social network of any individual user as it indirectly connects all users.

A restaurant rating website that employs embodiments of the invention in its rating algorithm, for example via an Application Programming Interface, can weight each restaurant rating using the raters' reputation scores for recommending restaurants, resulting in restaurant ratings that take into account source reputation. As this already represents an improvement over the site's previous rating method it may enhance S's search.

However, from the perspective of embodiments of the invention, restaurant recommendations represent a domain-attribute combination that lends itself to agreement path analysis, as they represent a voting area relating to consumer preferences, or rather individual taste. This means that S has several options to assess the relevance of a restaurant recommendation.

Even if S remains anonymous vis-á-vis the restaurant recommendation site because she does not have an account there, she can still determine whether a recommendation is relevant to her (i.e. whether the recommendation/rating or group of recommendations/ratings belongs to an agreement path on which she resides) if the restaurant employs embodiments of the invention in a way that disaggregates ratings into different agreement paths and marks those paths, for example, visually. As explained above, agreement path analysis addresses statistical bias in ratings and thus, such disaggregation would still yield useful results. For example, assume a restaurant had a total of five star ratings: 2× one star, 1× two stars, 2× five stars. If these ratings are not weighted, either because the site does not employ reviewer ratings combined with weighting or because ratings are placed by anonymous users such as S, the restaurant's mean rating would be 2.8 stars (2×1 star+1×2 stars+2×5 stars=14, divided by 5 users). In other words, 2.8 stars is the rating based on which S would have to make a consumption decision about said restaurant without the involvement of embodiments of the invention. However, S may really belong to an outlier group such as the one that would like the restaurant very much and thus rate it five stars. If the site employed embodiments of the invention, agreement path analysis would enable S to identify to which group she belongs and thus greatly facilitate her decision. S may, for instance, know that she belongs to agreement path "174" (or "blue" or "G") with regards to restaurant recommendations. By looking at the disaggregated ratings, she will learn that people on this agreement path actually recommend the restaurant very highly, thereby enabling her to make a consumption decision at a higher level of confidence than would be the case without employing embodiments of the invention.

Alternatively, S may have an account with the restaurant rating site, enabling the site to provide to S and every other user the most relevant rating directly, using agreement path analysis.

Another option for S would be to use embodiments of the invention directly and determine restaurant relevance by looking at the recommendations of her personal contacts and their recommendations, or by sorting her agreement paths for restaurant recommendations. Similarly, by using agreement path analysis S can gather the relevance to her of any recommendation by anyone on any site, regardless of whether the site is a dedicated rating site, as long as the respective recommenders/raters use embodiments of the invention. For example, a blogger may recommend a certain product or service on a blog. As long as the blogger uses embodiments of the invention, visitors to his blog can determine their agreement path relationships with said blogger, for example, if the blogging platform employed embodiments of the invention, or if the blogger utilized on his blog a badge or any other means to publicize his reputations (i.e. his scoring and rankings information) as determined by embodiments.

Figure 11:
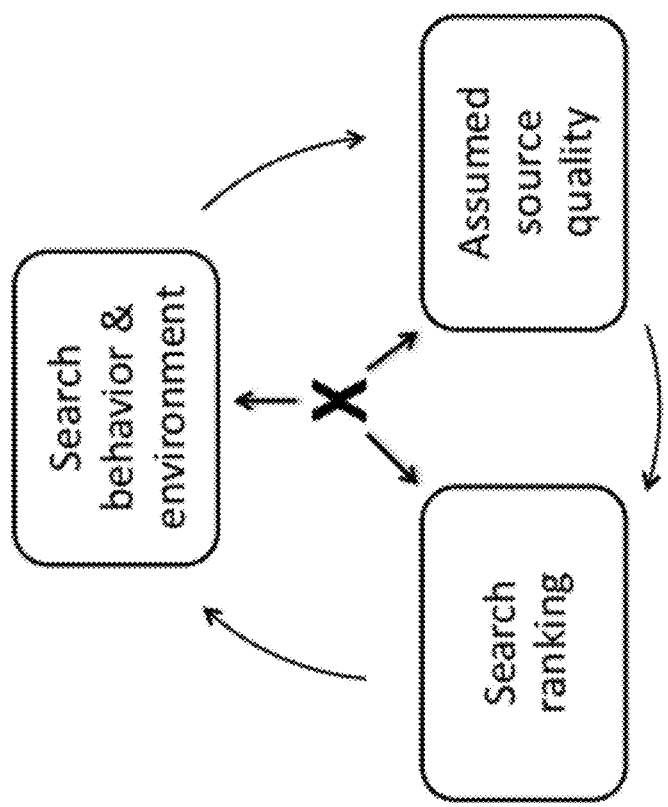
FIG. 11 illustrates the typical circular logic employed by search facilitators who assume the more links or traffic to a source, the higher the reputation of the source.

FIG. 11 illustrates the typical circular logic employed by known search providers that employ algorithms, which approximate source quality by evaluating user behavior (e.g. number of page visits) or search environment (e.g. measures of connectedness among different sites). Such quality assessment methods generate search output that correlates with the methods themselves. For example, sites that rank high in search results will invariably attract more page visits or get linked to more often. As shown, embodiments of the invention can help mitigate this effect by enabling information sources, information searchers, and search providers to leverage reputation information X that is unrelated to the original analysis method employed.

While the invention herein disclosed has been described by means of specific embodiments and applications thereof, numerous modifications and variations could be made thereto by those skilled in the art, without departing from the scope of the invention set forth in the claims.

What is claimed is:
1. A process comprising:
obtaining reputation ratings from the users of one or more social networks,
at least some of the users being raters,
at least some of the users being rated users,
at least some of the users being both raters and rated users,
each of the rated users being rated by one or more of the raters,
wherein at least one of the users includes a first user who has rated the reputation of a second user and wherein said second user has rated the reputation of a third user,
said one or more social networks being selected from a group that includes online social networks and offline social networks;
obtaining, from said first user, a first plurality of reputation ratings of a first group of the users, wherein said first group of the users includes said second user, and wherein said first plurality of reputation ratings includes said first user's reputation rating of said second user;
obtaining, from said second user, a second plurality of reputation ratings of a second group of the users, wherein said second group of the users includes said third user, and wherein said second plurality of reputation ratings includes said second user's reputation rating of said third user;
receiving a data query from an entity;
parsing said data query;
identifying a subset of all the users within said one or more social networks comprising
determining an agreement path from said first user to said second user to said third user,
said determining depending on said parsing said data query,
said determining depending on said first user's reputation rating of said second user and
said second user's reputation rating of said third user;
obtaining data items from at least some of the users in said subset of all the users within said one or more social networks;
sorting said data items, said sorting depending on said determining said agreement path;
returning to said entity a query response comprising said data items, said returning depending at least partly on said sorting.

2. The method of claim 1, wherein said obtaining reputation ratings is selected from a group that includes scoring and ranking and voting and marking and assigning.

3. The method of claim 1, wherein said entity is selected from a group that includes users and nonusers of the one or more social networks.

4. The method of claim 1, wherein said obtaining reputation ratings comprises weighting each of the reputation ratings of the rated users with a weighting factor, said weighting factor depending at least in part on the reputation ratings of the raters that have rated the rated users.

5. A process comprising:
obtaining reputation ratings from the users of one or more social networks,
at least some of the users being raters,
at least some of the users being rated users,
at least some of the users being both raters and rated users,
each of the rated users being rated by one or more of the raters, wherein at least one of the users includes a first user who has rated the reputation of a second user and wherein said second user has rated the reputation of a third user, said one or more social networks being selected from a group that includes online social networks and offline social networks;

receiving a data query from an entity;

parsing said data query;

identifying a subset of all the users within said one or more social networks comprising:

determining said first user as a first segment of an agreement path, said determining depending on said parsing said data query, determining said second user as a second segment of said agreement path, said determining depending at least partly on said first user's reputation rating of said second user, determining said third user as a third segment of said agreement path, said determining depending at least partly on said second user's reputation rating of said third user;

obtaining data items from at least some of the users in said subset of all the users within said one or more social networks;

sorting said data items, said sorting depending on said identifying said subset of all the users within said one or more social network;

returning to said entity a query response comprising said data items, said returning depending at least partly on said sorting.

6. The method of claim 5, wherein said obtaining reputation ratings is selected from a group that includes scoring and ranking and voting and marking and assigning.

7. The method of claim 5, wherein said entity is selected from a group that includes users and nonusers of the one or more social networks.

8. The method of claim 5, wherein said obtaining reputation ratings comprises weighting each of the reputation ratings of the rated users with a weighting factor, said weighting factor depending at least in part on the reputation ratings of the raters that have rated the rated users.

9. A process comprising:

obtaining reputation ratings from the users of one or more social networks, at least some of the users being raters, at least some of the users being rated users, at least some of the users being both raters and rated users, each of the rated users being rated by one or more of the raters, wherein at least one of the users includes a first user who has rated the reputation of a second user and wherein said second user has rated the reputation of a third user, said one or more social networks being selected from a group that includes online social networks and offline social networks;

receiving a data query from an entity;

parsing said data query;

identifying a subset of all the users within said one or more social networks comprising:

determining said first user as a first segment of an agreement path, said determining depending on said parsing said data query, ranking a first plurality of the users that have been rated by said first user, wherein said ranking said first plurality of the users depends at least partly on said first user's reputation ratings of said first plurality of the users, and wherein said first plurality of the users includes said second user, determining said second user as a second segment of said agreement path, said determining depending at least partly on said ranking said first plurality of the users, ranking a second plurality of the users that have been rated by said second user, wherein said ranking said second plurality of the users depends at least partly on said second user's reputation ratings of said second plurality of the users, and wherein said second plurality of the users includes said third user, determining said third user as a third segment of said agreement path, said determining depending at least partly on said ranking said second plurality of the users;

obtaining data items from at least some of the users in said subset of all the users within said one or more social networks;

sorting said data items, said sorting depending on said identifying said subset of all the users within said one or more social networks;

returning to said entity a query response comprising said data items, said returning depending at least partly on said sorting.

10. The method of claim 9, wherein said obtaining reputation ratings is selected from a group that includes scoring and ranking and voting and marking and assigning.

11. The method of claim 9, wherein said entity is selected from a group that includes users and nonusers of the one or more social networks.

12. The method of claim 9, wherein said obtaining reputation ratings comprises weighting each of the reputation ratings of the rated users with a weighting factor, said weighting factor depending at least in part on the reputation ratings of the raters that have rated the rated users.

\* \* \* \* \*